US012731437B2

(12) United States Patent
Wang et al.

(10) Patent No.: US 12,731,437 B2
(45) Date of Patent: Sep. 8, 2026

(54) VIRTUAL TRAINER ON MOBILE/IOT DEVICES

(71) Applicant: Samsung Electronics Co., Ltd., Suwon-si (KR)

(72) Inventors: Yibing Michelle Wang, Temple City, CA (US); Hongyu Wendy Wang, South Pasadena, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1130 days.

(21) Appl. No.: 17/564,195

(22) Filed: Dec. 28, 2021

(65) Prior Publication Data

US 2023/0130555 A1 Apr. 27, 2023

Related U.S. Application Data

(60) Provisional application No. 63/271,705, filed on Oct. 25, 2021.

(51) Int. Cl.
*G06V 40/20* (2022.01)
*A63B 24/00* (2006.01)
(Continued)

(52) U.S. Cl.
CPC .......... *G06V 40/23* (2022.01); *A63B 24/0062* (2013.01); *A63B 24/0075* (2013.01);
(Continued)

(58) Field of Classification Search
CPC ................ G06V 40/23; A63B 24/0062; A63B 24/0075; A63B 71/0622;
(Continued)

(56) References Cited

U.S. PATENT DOCUMENTS

| | | | |
|---|---|---|---|
| 9,330,239 | B2 | 5/2016 | Koduri et al. |
| 10,188,930 | B2 | 1/2019 | Winsper et al. |

(Continued)

FOREIGN PATENT DOCUMENTS

| | | |
|---|---|---|
| WO | 2019231982 A1 | 12/2019 |
| WO | 2020132110 A1 | 6/2020 |
| WO | 2021014149 A1 | 1/2021 |

OTHER PUBLICATIONS

Fieraru, Mihai et al., "AIFit: Automatic 3D Human-Interpretable Feedback Models for Fitness Training," Proceedings of the IEEE/CVF Conference on Computer Vision and Pattern Recognition, 2021, pp. 9919-9928.

(Continued)

*Primary Examiner* — Peter S Vasat
*Assistant Examiner* — Stephen Alvesteffer
(74) *Attorney, Agent, or Firm* — Renaissance IP Law Group LLP

(57) ABSTRACT

A virtual training system and method are disclosed. The system and methods include receiving, at a processing device, a two-dimensional (2D) image of a user from a 2D image sensor; receiving, at the processing device, a three-dimensional (3D) image of the user from a 3D image sensor; receiving, at the processing device, at least one biometric characteristic of the user; generating, by the processing device, feedback information relating to movement of the user during a session compared to a standard form movement; and outputting the feedback information to the user as an image of the user captured by at least one of the 2D image sensor and the 3D image sensor overlayed on an instructor avatar.

19 Claims, 3 Drawing Sheets

(51) Int. Cl.

| | |
|---|---|
| ***A63B 71/06*** | (2006.01) |
| ***G06T 13/40*** | (2011.01) |
| ***G06T 13/80*** | (2011.01) |
| ***G06T 19/00*** | (2011.01) |

(52) U.S. Cl.

CPC .......... *A63B 71/0622* (2013.01); *G06T 13/40* (2013.01); *G06T 13/80* (2013.01); *G06T 19/006* (2013.01); *A63B 2071/0625* (2013.01); *A63B 2071/0636* (2013.01); *A63B 2220/05* (2013.01); *A63B 2244/10* (2013.01); *A63B 2244/22* (2013.01)

(58) Field of Classification Search

CPC .... A63B 2071/0625; A63B 2071/0636; A63B 2220/05; A63B 2244/10; A63B 2244/22; A63B 24/0006; A63B 2024/0012; A63B 2220/806; A63B 2230/00; G06T 13/40; G06T 13/80; G06T 19/006; G06T 19/20; G16H 30/40; G16H 50/20; G16H 50/30; G16H 20/30; H04M 1/0264; H04N 23/55

USPC .......................................................... 434/257

See application file for complete search history.

(56) References Cited

U.S. PATENT DOCUMENTS

| | | | | |
|---|---|---|---|---|
| 10,369,412 | B2 | 8/2019 | Aragones et al. | |
| 10,583,328 | B2 | 3/2020 | Aragones et al. | |
| 10,943,407 | B1 * | 3/2021 | Morgan | G16H 15/00 |
| 11,051,767 | B2 | 7/2021 | Kaleal, III et al. | |
| 11,065,527 | B2 | 7/2021 | Putnam | |
| 11,615,648 | B2 * | 3/2023 | Lee | G06T 13/40 482/9 |
| 11,990,233 | B2 * | 5/2024 | Kaleal, III | A61B 5/43 |
| 2007/0038153 | A1 * | 2/2007 | Basson | G06F 3/017 600/595 |
| 2012/0183940 | A1 * | 7/2012 | Aragones | A63B 22/00 434/247 |
| 2014/0225978 | A1 * | 8/2014 | Saban | G02B 5/08 348/14.07 |
| 2020/0054929 | A1 | 2/2020 | Ward et al. | |
| 2020/0111384 | A1 | 4/2020 | Bell et al. | |
| 2021/0008413 | A1 | 1/2021 | Asikainen et al. | |
| 2021/0093920 | A1 | 4/2021 | Poulin et al. | |
| 2021/0197022 | A1 | 7/2021 | Liu | |
| 2021/0307650 | A1 * | 10/2021 | Barr | A61B 5/1121 |
| 2022/0296966 | A1 * | 9/2022 | Asikainen | G16H 20/30 |

OTHER PUBLICATIONS

Venek, Verena et al., "Towards a Live Feedback Training System: Interchangeability of Orbbec Persee and Microsoft Kinect for Exercise Monitoring," Designs 2021, vol. 5, No. 30, 2021, 15 pages.

Xie, Haoran et al., "Visual Feedback for Core Training with 3D Human Shape and Pose," 2019 Nicograph International (NicoInt), 2019, 9 pages.

* cited by examiner

VIRTUAL TRAINER ON MOBILE/IOT DEVICES

CROSS-REFERENCE TO RELATED APPLICATION

This application claims the priority benefit under 35 U.S.C. § 119(e) of U.S. Provisional Application No. 63/271,705, filed on Oct. 25, 2021, the disclosure of which is incorporated herein by reference in its entirety.

TECHNICAL FIELD

The subject matter disclosed herein relates to virtual training system. More particularly, the subject matter disclosed here relates to a system and a method for providing a virtual trainer to a user.

BACKGROUND

Physical training has been popular and is becoming more popular. A good personal trainer assures that training is done properly to avoid injuries. Finding a good trainer and/or being able to schedule time with a good trainer, however, may sometimes be a challenge. Making an instant appointment with a real-life trainer may be nearly impossible. Consequently, having a virtual trainer providing a standardized approach to physical training may be beneficial. Additionally, in situations, like a pandemic, when most gyms are closed and social distance should be observed, a virtual trainer on a mobile or an IOT device may be a highly desirable solution for safely and conveniently physically training.

Currently, people use fitness videos in a virtual environment, such as on YouTube or Mirror, to perform physical exercise moves. There is no feedback that indicates whether the postures and/or movements of a user are correct. Interaction with a real trainer is lacking in a video-based virtual environment. One existing exercise system uses a 3D camera to track movements of a user in order to play fitness games. There is no active feedback to correct, improve and/or refine movement of a user. Another existing system shows an avatar of a user on a display, but the avatar does not reflect the actual posture or actual movement of the user. Still another existing system uses a mirror-cast image of a user, which also shows movement of a virtual coach. No analyzed feedback, however, is provided.

SUMMARY

An example embodiment provides a virtual training system that may include a two-dimensional (2D) image sensor, a three-dimensional (3D) image sensor, a biometric data sensor, a processing device, and an output device. The 2D image sensor may be configured to sense a 2D image of a user, and the 3D image sensor may be configured to sense a 3D image of the user including a movement of the user. The biometric data sensor may be configured to sense at least one biometric characteristic of the user. The processing device may be configured to receive the 2D image in which the 3D image and the at least one biometric characteristic of the user. The processor further configured to generate feedback information relating to movement of the user during a session compared to a standard form movement. The output device may be configured to provide the feedback information to the user as an image of the user captured by at least one of the 2D image sensor and the 3D image sensor overlayed on an instructor avatar. In one embodiment, the processing device is further configured to generate the feedback information in real time during the session. In another embodiment, the output is further configured to provide the feedback information to the user as at least one of graphical and textual information. In still another embodiment, the output device may further include an audio output device configured to provide the feedback information as audible information. In yet another embodiment, the processing device may be further configured to generate a profile for the user based on at least one of the 2D image, the 3D image and the at least one biometric characteristic of the user. In one embodiment, the processing device may be further configured to generate the instructor avatar to illustrate the standard form movement based on the profile for the user. In another embodiment, the processing device may be further configured to adapt the instructor avatar to the user based on the profile for the user. In still another embodiment, the processing device may be further configured to monitor at least one biometric characteristic of the user compared to a safe zone of the at least one biometric characteristic during the session. In one embodiment, at least one of the 2D image sensor and the 3D image sensor may be part of a smartphone. In still another embodiment, the standard form movement may include one of an exercise movement, a dance movement, a martial arts movement, or a physical therapy movement.

An example embodiment provides a method that may include receiving a 2D image of a user from a 2D image sensor; receiving a 3D image of the user from a 3D image sensor; receiving at least one biometric characteristic of the user; generating, by a processing device, feedback information relating to movement of the user during a session compared to a standard form movement; and outputting the feedback information to the user as an image of the user captured by at least one of the 2D image sensor and the 3D image sensor overlayed on an instructor avatar. In one embodiment, generating the feedback information may include generating the feedback information in real time during the session. In another embodiment, outputting the feedback information may further include outputting the feedback information as at least one of graphical and textual information. In still another embodiment, outputting the feedback information may further include outputting the feedback information to an audio device configured to provide the feedback information as audible information. In yet another embodiment, the method may further include generating, by the processing device, a profile for the user based on at least one of the 2D image, the 3D image and the at least one biometric characteristic of the user. In one embodiment, the method may further include generating, by the processing device, the instructor avatar to illustrate the standard form movement based on the profile for the user. In another embodiment, the method may further include adapting, by the processing device, the instructor avatar to the user based on the profile for the user. In still another embodiment, the method may further include monitoring, by the processing device, at least one biometric characteristic of the user compared to a safe zone of the at least one biometric characteristic during the session. In yet another embodiment, at least one of the 2D image sensor and the 3D image sensor may be part of a smartphone. In one embodiment, the standard form movement may include one of an exercise movement, a dance movement, a martial arts movement, or a physical therapy movement.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
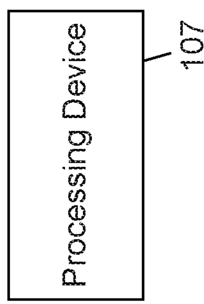
FIG. 1 depicts an example embodiment of a virtual training system according to the subject matter disclosed herein.
Figure 1:
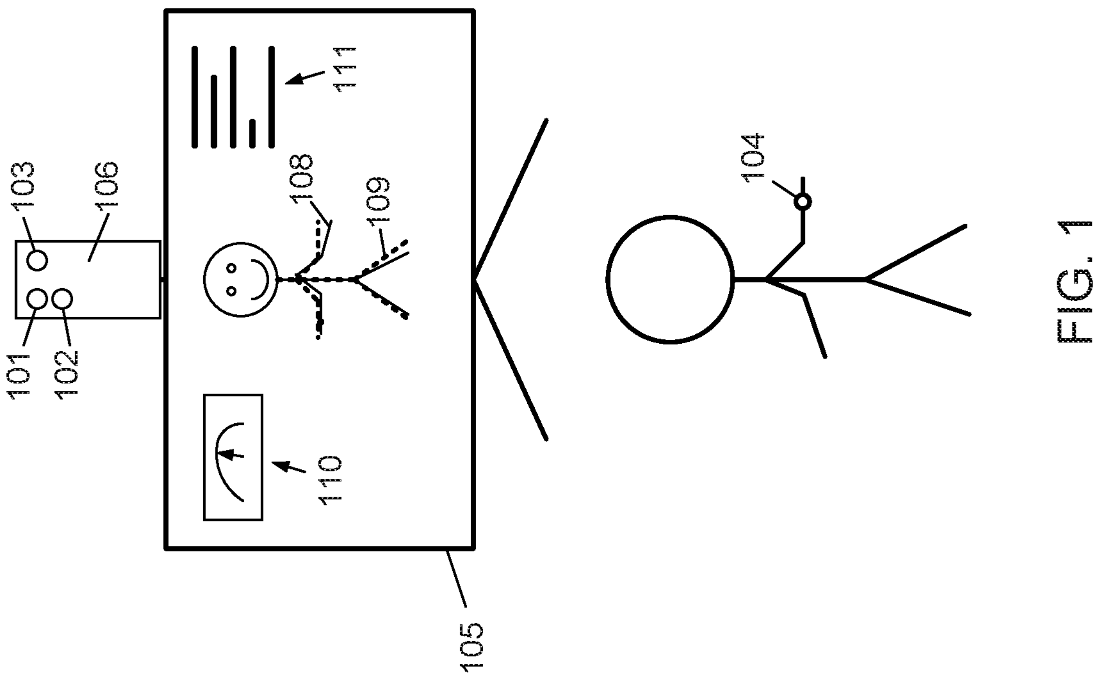

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein provides a virtual training system that uses a two-dimensional (2D) and three-dimensional (3D) cameras, a wearable device and a display to help a user to properly and efficiently perform physical motion, such as, but not limited to, exercise, dance routines, martial arts routines and/or physical therapy motion, at home while avoiding injuries. Real-time feedback about movement of the user may be provided on the display and/or by an audible voice to advise a user about what the user has done correctly and incorrectly with respect to a standard form movement. In one embodiment, real-time feedback is provided that is based on a personal profile of the user. Additionally, the feedback may be provided to guide the user to slow down a workout session or to stop to avoid an injury.

The 2D RGB (Red, Green, Blue) imaging sensor and a 3D imaging sensor that may be available on, for example, a smartphone or an Internet of Things (IoT) device. Each of the cameras may be configured to capture data with or without active illumination. The wearable device may be, for example, a sports wristband or watch, and may be used to monitor one or more biometric condition, such as, but not limited to, heart rate, body temperature, blood oxygen level, calories burned, etc. An application processor that may be either on the smartphone or the IoT device, located remotely from the image sensors and display, or that may be provided by cloud computing may be used to process 2D imaging to recognize the presence of the user and to process 3D depth data to analyze the user's posture and motion, and the biometric data. The display may show a standard movement performed by an avatar and the corresponding movement of the user.

A user profile may be generated that may include a physical profile of the user that includes both physiological characteristics and biometric information, such as, but not limited to, heart rate, body temperature, body mass, percentage body fat, age, gender, injuries, body temperature, blood oxygen level, calories burned, etc. The information forming the user profile may be generated based on information sensed by the 2D/3D image sensors and the wearable device to provide an accurate physical representation of the user, and based on input from the user. The user profile may then be used to customize the standard form of each movement to the profile of the user, and to correlate biometric data of the user to the movements of the user. The 2D/3D sensors may also be used to provide an accurate measurement of the physical movement of the user. The user profile may also be used to extrapolate or estimate exercise movement parameters of which the user may be capable based on extrapolated or estimated limitations physical limitations of the user, and generate customized, ideal movements for the user taking into account body shape, injuries, biometric data, etc. In one embodiment, the system disclosed herein includes an ability to continue an exercise session, modify exercise movements of a user, and end an exercise session when it is appropriate.

The virtual training system disclosed herein may generate 2D RGB images and a 3D point cloud, and display processed information including feedback on a display. One embodiment of the virtual training system disclosed herein may include at least one 2D visible-light camera, one 3D camera, and one or more biometric sensors in which the output of each sensor may be integrated onto a display device to provide visual feedback. The display device may be, for example, a smart TV or projector. Additionally or alternatively, the wearable device may also provide a notification using a vibration, a tone, and/or audible voice.

An algorithm executed by a processing device may generate a 3D physical profile of the user using the 2D/3D information and other biometric-type information provided by the user, analyze posture and/or movement of the user, and then provide feedback to the user based on what the user has correctly and/or incorrectly performed based on the standard form that has been customized to the profile of the user. The feedback may include showing posture and/or movement of the user with an overlapping image of a standard form movement. In one embodiment, the feedback may also include an on-screen text display or an audible voice explaining what should be corrected using detailed instructions. By so doing, the correct and incorrect aspects may be easier for the user to identify. The algorithm may also analyze the biometric data of the user and provide feedback to the user to adjust the intensity of a workout session to avoid an injury. That is, when the biometric data is not in a safe range, an on-screen text display or audible voice may also advise the user to slow down or stop.

In one embodiment, the virtual training system disclosed herein provides feedback to a user during an exercise or training session based on body characteristics received from 2D/3D image sensors and the wearable device. An exercise session may be initiated, exercise movements tracked, the detected exercise movements compared to exercise movements customized for the user using the captured 2D/3D images and wearable device data. The captured exercise movements and biometric data may be displayed in conjunction with the customized idealized exercise movements for the user along with visual, vibratory and/or audio feedback to correct for improper movements.

FIG. 1 depicts an example embodiment of a virtual training system 100 according to the subject matter disclosed herein. The system 100 may include a 2D RGB camera 101, a 3D depth camera 102, an optional light source 103, a wearable device 104, and a display 105. The 2D camera 101 may sense, or capture, shape and color information in visible-light spectrum range. The 3D depth camera 102 may sense, or capture, volume and motion with depth, or range, information. The light source 103 may provide illumination in low-light environments. In one embodiment, the 2D camera 101, the 3D camera 102 and the optional light source 103 may be part of a portable device 106, such as, but not limited to, a smartphone. In another embodiment, the 2D camera 101, the 3D camera 102 and the optional light source 103 may be part of an IoT device.

The wearable device 104 may sense, or capture, biometric-type data, such as, but not limited to heart rate and body temperature. The display 105 may be part of the portable device or may be a device that is different from the portable device, such as a television or a monitor. Data produced by the 2D/3D image sensors and the wearable device 104 may be communicated throughout the system 100 using wireless communication techniques. Data produced by the 2D/3D image sensors may be processed and analyzed by an application processor 107 that may be located on the portable device 106, be a remotely located processing device (depicted in FIG. 1), such as on a personal computer (PC), or in the cloud (not shown). In one embodiment, processing and analyzing of the captured data may be a distributed processing function between the portable device 106, a remotely located processing device and/or in the cloud. In one embodiment, the application processor 107 may be formed by one or more modules that are collocated or may be distributed based on available computing power.

An image 108 (solid lines in FIG. 1) captured of the user by the 2D and/or 3D image sensors may be displayed on the display 105 overlayed by an instructor avatar 109 (dashed lines in FIG. 1). The instructor avatar may be customized to the physical characteristics of the user based on the user profile. As the instructor avatar 109 moves on the display 105, the image captured by the 2D and/or 3D image sensors is also displayed on the display 105 so that a user can receive visual instruction for an exercise movement. Additional feedback may be displayed graphically 110 or textually 111 on the display 105.

Figure 2:
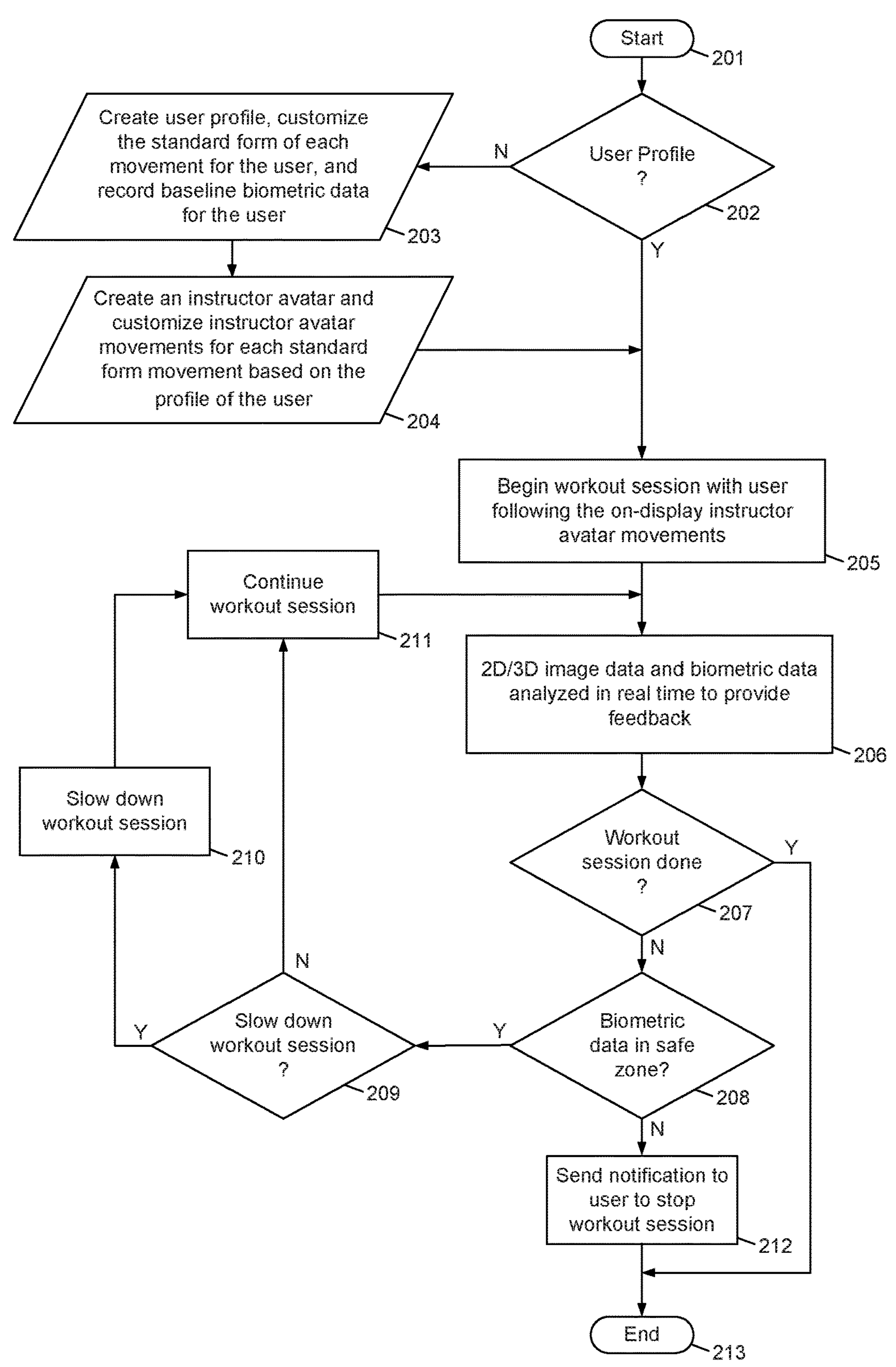
FIG. 2 is a flowchart of an example embodiment of an operational process for the virtual training system according to the subject matter disclosed herein.

FIG. 2 is a flowchart of an example embodiment of an operational process 200 for the virtual training system 100 depicted in FIG. 1. The process starts at 201. At 202, it is determined whether a user profile has been created for a user. If not, flow continues to 203 where a user profile is created and baseline biometric data is recorded. The standard form for each movement is customized to the physical characteristics of the user. At 204, an instructor avatar is created, which may be customized to the physical characteristics of the user based on the user profile. That is, the physical movements displayed by the instructor avatar may be customized to the user based on the user profile. Flow continues to 205.

If, at 201, a user profile has already been created, flow continues to 205 where a workout session begins with the user following the instructor avatar movements. As used herein, a workout session may refer to an exercise, a dance routine, a martial arts routine, or physical therapy motion. At 206, the 2D and 3D cameras capture video images of the user performing the movements of the workout session. Biometric data of the user during the workout session may also be captured. For one or more initial, or beginning, workout sessions, the captured biometric data may be used to establish baseline biometric data during a workout session. The 2D/3D image data and biometric data may be analyzed in real time to provide feedback to the user.

At 207, it is determined whether the workout session has completed. If at 208, it is determined that the workout session has completed, flow continues to 213 where the workout session ends. If, at 207, it is determined that the workout session is not complete, flow continues to 208 where it is determined whether the biometric data for the workout session is in a safe zone for the user. If, at 208, it is determined that the biometric data is not in a safe zone, flow continues to 212, where a notification is sent to the user to stop the workout session. Flow continues to 213 where the workout session ends.

If, at 208, it is determined that the biometric data is in a safe zone, flow continues to 209 where it is determined whether to slow down the workout session based on the currently received biometric data. If so, flow continues to 210 where the workout session is slowed down, and flow continues to 211 where the workout session continues at a slower rate. If, at 209, it is determined that the workout session does not need to slow down, flow continues to 211 where the workout session continues at the initial rate. Flow then continues to 206.

Figure 3:
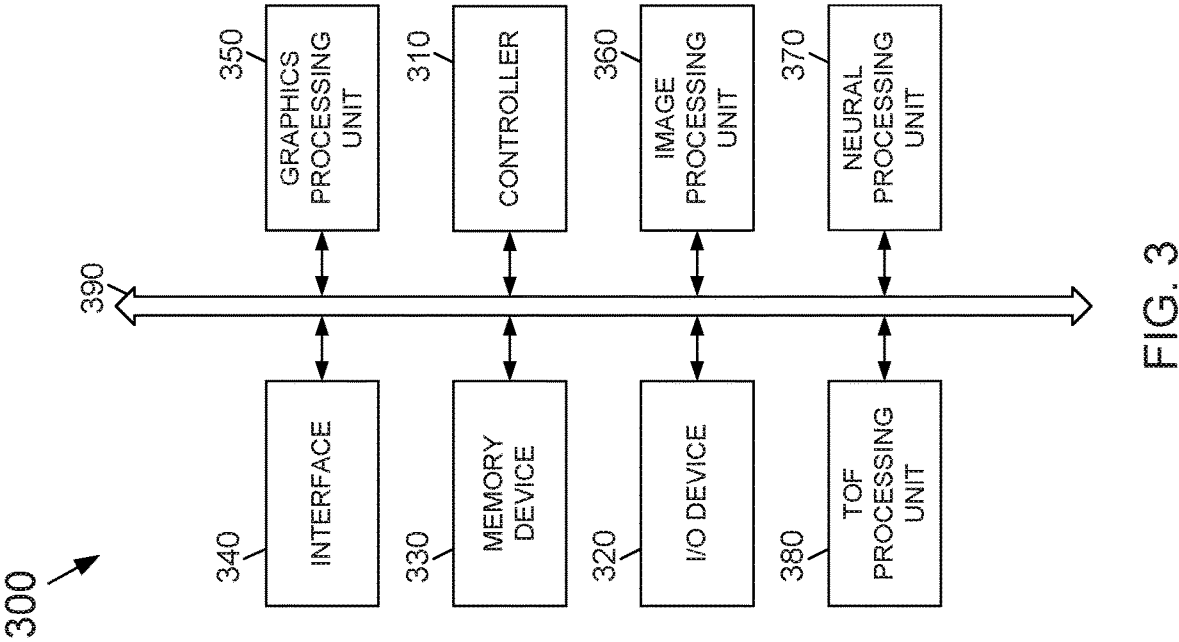
FIG. 3 depicts an electronic device that includes a virtual training system according to the subject matter disclosed herein.

FIG. 3 depicts an electronic device 300 that includes a virtual training system according to the subject matter disclosed herein. The electronic device 300 may include a controller (or CPU) 310, an input/output device 320 such as, but not limited to, a keypad, a keyboard, a display, a touch-screen display, a 2D image sensor (FIG. 1), a 3D image sensor (FIG. 1), a memory 330, an interface 340, a GPU 350, an imaging-processing unit 360, a neural processing unit 370, a TOF processing unit 380 that are coupled to each other through a bus 390. The controller 310 may include, for example, at least one microprocessor, at least one digital signal processor, at least one microcontroller, or the like. The memory 330 may be configured to store a command code to be used by the controller 310 and/or to store a user data. The TOF processing unit 380 may be configured based on one or more of the example embodiments described in connection with FIGS. 1 and 2 herein.

Electronic device 300 and the various system components of electronic device 300 may be formed from one or modules. The interface 340 may be configured to include a wireless interface that is configured to transmit data to or receive data from, for example, a wireless communication network using a RF signal. The wireless interface 340 may include, for example, an antenna. The electronic system 300 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A virtual training system, comprising:

a two-dimensional (2D) image sensor configured to capture a 2D image of a user;

a three-dimensional (3D) image sensor configured to sense a volume and motion of the user and generate 3D image data of the user based on the sensed volume and motion of the user;

a wireless receiver configured to receive a wireless signal that includes biometric data from a biometric data sensor worn by the user, the biometric data comprising at least one biometric characteristic of the user sensed by the biometric sensor;

a processing device configured to receive the 2D image, the 3D image data, and the at least one biometric characteristic of the user, the processing device further configured to:

generate a profile for the user based on the 2D image, the 3D image data, and the at least one biometric characteristic of the user;

generate, based on the profile of the user, a customized form movement by modifying one or more parameters of a standard form movement according to the profile of the user derived from the 2D image, the 3D image data, and the at least one biometric characteristic;

generate, based on processing the 2D image, the 3D image data, and the at least one biometric characteristic of the user, feedback information relating to movement of the user during a session compared to the customized form movement; and an output device configured to provide the feedback information to the user as an image of the user captured by at least one of the 2D image sensor and the 3D image sensor overlayed on an instructor avatar.

2. The virtual training system of claim 1, wherein the processing device is further configured to generate the feedback information in real time during the session.

3. The virtual training system of claim 1, wherein the output device is further configured to provide the feedback information to the user as at least one of graphical and textual information.

4. The virtual training system of claim 1, wherein the output device further comprises an audio output device configured to provide the feedback information as audible information.

5. The virtual training system of claim 1, wherein the processing device is further configured to generate the instructor avatar to illustrate the standard form movement based on the profile for the user.

6. The virtual training system of claim 5, wherein the processing device is further configured to adapt the instructor avatar to the user based on the profile for the user.

7. The virtual training system of claim 1, wherein the processing device is further configured to monitor the at least one biometric characteristic of the user compared to a safe zone of the at least one biometric characteristic during the session.

8. The virtual training system of claim 1, wherein at least one of the 2D image sensor and the 3D image sensor comprises part of a smartphone.

9. The virtual training system of claim 1, wherein the standard form movement comprises one of an exercise movement, a dance movement, a martial arts movement, or a physical therapy movement.

10. The virtual training system of claim 1, wherein the processing device is further configured to:

compare the at least one biometric characteristic to a safe zone based on the processing device monitoring the at least one biometric characteristic during the session; and based on a determination that the at least one biometric characteristic is outside the safe zone, modify, without user intervention, an intensity or pace of the session.

11. A method, comprising:

receiving, at a processing device, a two-dimensional (2D) image of a user from a 2D image sensor;

receiving, at the processing device, a three-dimensional (3D) image of the user from a 3D image sensor configured to sense a volume and motion of the user and generate computer 3D image data of the user based on the sensed volume and motion of the user;

receiving, at the processing device via a wireless receiver, biometric data, the wireless receiver being configured to receive a wireless signal that includes biometric data from a biometric data sensor worn by the user, the biometric data comprising at least one biometric characteristic of the user;

generating a profile for the user based on the 2D image, the 3D image data, and the at least one biometric characteristic of the user;

generating, by the processing device and based on the profile of the user, a customized form movement by modifying one or more parameters of a standard form movement according to the profile of the user derived from the 2D image, the 3D image data, and the at least one biometric characteristic;

generating, by the processing device, feedback information relating to movement of the user during a session compared to the customized form movement; and outputting the feedback information to the user as an image of the user captured by at least one of the 2D image sensor and the 3D image sensor overlayed on an instructor avatar.

12. The method of claim 11, wherein generating the feedback information comprises generating the feedback information in real time during the session.

13. The method of claim 11, wherein outputting the feedback information further comprises outputting the feedback information as at least one of graphical and textual information.

14. The method of claim 11, wherein outputting the feedback information further comprises outputting the feedback information to an audio device configured to provide the feedback information as audible information.

15. The method of claim 11, further comprising generating, by the processing device, the instructor avatar to illustrate the standard form movement based on the profile for the user.

16. The method of claim 15, further comprising adapting, by the processing device, the instructor avatar to the user based on the profile for the user.

17. The method of claim 11, further comprising monitoring, by the processing device, the at least one biometric characteristic of the user compared to a safe zone of the at least one biometric characteristic during the session.

18. The method of claim 11, wherein at least one of the 2D image sensor and the 3D image sensor comprises part of a smartphone.

19. The method of claim 11, wherein the standard form movement comprises one of an exercise movement, a dance movement, a martial arts movement, or a physical therapy movement.

* * * * *